United States Patent [19]

Taga et al.

[11] Patent Number: 5,085,915
[45] Date of Patent: Feb. 4, 1992

[54] MAGNETIC RECORDING MEDIUM

[75] Inventors: Kazuaki Taga; Takeshi Tsuda; Hiroo Inaba; Hiroshi Ogawa, all of Kanagawa, Japan

[73] Assignee: Fuji Photo Film Co., Ltd., Kanagawa, Japan

[21] Appl. No.: 640,512

[22] Filed: Jan. 11, 1991

Related U.S. Application Data

[63] Continuation of Ser. No. 467,467, Jan. 19, 1990, abandoned.

[30] Foreign Application Priority Data

Jan. 20, 1989 [JP] Japan ................................. 1-11259

[51] Int. Cl.$^5$ ............................................. G11B 23/00
[52] U.S. Cl. ..................................... 428/141; 428/323; 428/329; 428/331; 428/480; 428/694; 428/900
[58] Field of Search ............... 428/323, 331, 141, 143, 428/694, 480, 900, 329

[56] References Cited

U.S. PATENT DOCUMENTS

| | | | |
|---|---|---|---|
| 4,670,319 | 6/1987 | Katoh et al. | 428/480 |
| 4,732,799 | 3/1988 | Sakamoto et al. | 428/480 |
| 4,778,708 | 10/1988 | Nishino et al. | 428/480 |
| 4,784,895 | 11/1988 | Mizuno et al. | 428/900 |
| 4,840,830 | 6/1989 | Sakamoto et al. | 428/480 |
| 4,865,924 | 9/1989 | Saito et al. | 428/900 |

Primary Examiner—Paul J. Thibodeau
Attorney, Agent, or Firm—Sughrue, Mion, Zinn, Macpeak & Seas

[57] ABSTRACT

A magnetic recording medium which comprises plurality of magnetic layers comprising at least first and second magnetic layers which are successively formed on a surface of a polyethylene terephthalate support, wherein said support contains inert inorganic particles having an average particle size of from 0.5 to 0.7 microns, a standard deviation of 0.1 microns or less and the surface of said support has a center line average roughness (Ra) of 16 nm or less and a density of protrusions (Ds) of 6000/mm$^2$ or more in the case of protrusions of 0.7 microns of more.

8 Claims, No Drawings

MAGNETIC RECORDING MEDIUM

This is a continuation of application Ser. No. 467,467, filed Jan. 19, 1990, now abandoned.

FIELD OF THE INVENTION

The present invention relates to a magnetic recording medium comprised of at least a nonmagnetic support and a magnetic layer, and more particularly it relates to a magnetic recording medium comprising plural magnetic layers.

BACKGROUND OF THE INVENTION

Recently with improvements in magnetic recording there has been a growing demand for a higher image quality and a higher audio quality. To meet such demand, it has been carried out to pulverize ferromagnetic particles and to increase the density of a magnetic recording medium. Also, an increased consumption of a magnetic recording medium may require that it is inexpensive. A magnetic recording medium comprising plural magnetic layers has been proposed to achieve the foregoing requirements, because an upper magnetic layer can provide characteristics for a high image quality, and a lower magnetic layer can provide characteristics for a high audio quality, thereby causing suitable ferromagnetic particles to be used. Further, the use of plural magnetic layers results in reduced costs because suitable materials can be used depending on each of the plural magnetic layers.

It is said that electromagnetic characteristics are effectively increased by improving the surface property of a magnetic layer.

Such electromagnetic characteristics of a magnetic recording medium should be evaluated on condition that the magnetic recording medium has an excellent running property of a predetermined level or higher. Therefore, in the magnetic recording medium, it is necessary that the magnetic layer and the backing layer should have a low friction coefficient in order to have an excellent running property.

The requisite of today's magnetic recording medium is that it must have excellent electromagnetic characteristics, excellent running durability, and excellent manufacturability.

In order to have excellent electromagnetic characteristics, it is necessary that the surface of the magnetic layer is made as smooth as possible. To this end, it is necessary that the surface of the support on which the magnetic layer is formed must be very smooth. Especially, in case of a magnetic recording tape comprising plural magnetic layers, the first magnetic layer influences the surface property of the tape itself. Therefore, the surface of the support which greatly influences the surface of the lower magnetic layer is important, and needs to be made smooth.

In order to have excellent running durability, it is necessary that the outer surface of the magnetic layer and the backing layer must have a low friction coefficient.

In general, the running property of the tape is determined depending upon the sliding property of the magnetic layer when the magnetic layer slides on a magnetic head or a cylinder, and depending upon the sliding property of the backing layer when the backing layer slides on a pole or a guide provided in a tape deck.

When the friction coefficient is high, problems such as slipping or sticking occur. In order to avoid such problems, it is known that lubricating agents may be added in or on the magnetic layer.

It is known that roughness of the back surface (i.e., the surface of the support opposite of the magnetic layers) of the support is preferably increased or a backing layer is provided thereon, because good friction coefficient is not obtained when the back surface of the support directly slides on a guide or a pole.

However, when the back surface of the support is made too rough, such roughness is transferred to the magnetic layer when the magnetic recording tape is wound, thereby deteriorating electromagnetic characteristics. Therefore, it is necessary that the roughness of the back surface of the support is not so large that it is transferred to the magnetic layer, and yet is enough to maintain good running property.

In order to have excellent manufacturability, in addition to plural magnetic layers, it is requested to have good running durability without forming a backing layer on the back surface of the support.

JP-A-63-175222 (The term "JP-A" as used herein means an "unexamined published Japanese patent application) proposes a support in which two kinds of spherical silicas are used as a filler, and dense protrusions are formed, thereby preventing the protrusions of the support from being deformed, keeping the friction coefficient constant, and preventing electromagnetic characteristics from being deteriorated.

However, when plural magnetic layers are formed on such a support in which two kinds of fillers each differing in size are added, the surface of the support is not made smooth. As a result, since the lower magnetic layer in the plural magnetic layers records audio signals and the ferromagnetic particles having a decreased specific surface area ($S_{BET}$) and a large average particle size are used to obtain a lower cost and further the coating composition having a large surface tension is used, the roughness of the support is further amplified and thereby a coarse lower magnetic layer is obtained. Accordingly, when the upper magnetic layer is provided on the lower magnetic layer, the obtained magnetic layers become coarse as a whole. It follows that electromagnetic characteristics in the magnetic layers are not so much improved, and big fillers present on the back surface or in the backing layer break off or become dislodged, thereby lowering durability.

Consequently, the back surface of the conventional support cannot be used as it is without forming a backing layer.

SUMMARY OF THE INVENTION

An object of the present invention is to provide a magnetic recording medium in which the surface of the support is smooth, the magnetic layers formed thereon have excellent electromagnetic characteristics, the back surface (i.e., the surface of the support opposite of the magnetic layers) of the support has good running durability and further has good running durability, without formation of a backing layer which leads to the decrease of the manufacturability, and the manufacturability thereof is high.

According to the present invention there is provided a magnetic recording medium which comprises plurality of magnetic layers comprising at least first and second magnetic layers which are successively formed on a surface of a polyethylene terephthalate (PET) support wherein said support contains inert inorganic particles having an average particle size of from 0.5 to 0.7 microns and a standard deviation of 0.1 microns or less, and the surface of said support has a center-line average roughness (Ra) of 16 nm or less and a density of protrusions (Ds) of 6000/mm$^2$ or more in the case of protrusions of 0.7 microns or more.

Examples of the inert inorganic particles include silica, calcium carbonate, alumina, and titanium oxide.

The magnetic recording medium according to the present invention is advantageously manufactured by a method comprising the steps of coating on the surface of a nonmagnetic support a coating composition for forming the first magnetic layer, and while the coated first magnetic layer is wet, coating thereon a coating composition for forming the second magnetic layer so that the second magnetic layer can have a dry thickness of 1.5 microns or less.

In the present invention, when the magnetic recording medium comprises two magnetic layers, the first magnetic layer represents the lower magnetic layer and the second magnetic layer represents the upper magnetic layer.

Further, the magnetic recording medium may comprise at least two magnetic layers such as the first, second and third magnetic layers.

Furthermore, one magnetic layer e.g., the first magnetic layer may further comprise plural magnetic layers.

The preferred embodiments according to the present invention are as follows:

(1) A magnetic recording medium in which the first magnetic layer has a dry thickness of preferably 2.5 to 5.0 microns and more preferably 3.0 to 4.0 microns, and the second magnetic layer has a dry thickness of preferably 0.3 to 1.5 microns and more preferably 0.5 to 0.8 microns.

(2) A magnetic recording medium comprising a polyethylene terephthalate support wherein a center line average roughness (Ra) in the back surface of said support as measured by a roughness measuring apparatus of a light interference type ("TOPO-3D" manufactured by WYKO Co., Ltd.) is 16 nm or less and preferably 12 nm or less and the density of protrusions (Ds) in the surface of said support is 6000/mm$^2$ or more, preferably 7000/mm$^2$ in the case of protrusions of 0.7 microns or more, and said support contains inert inorganic particles having an average particle size of 0.5 to 0.7 microns, having a standard deviation of 0.1 microns or less and having preferably a Mohs' hardness of 3 to 8, and said inorganic particles include silica, calcium carbonate, alumina, or titanium oxide, etc., and among these, silica and calcium carbonate are preferred as the inert inorganic particles. The content of the inert inorganic particles in said support is from 400 to 4000 ppm.

(3) A magnetic recording medium in which the magnetic layers comprise isocyanate, and in which the isocyanate content of the first magnetic layer is preferably from 8 to 12 parts by weight and more preferably from 9 to 11 parts by weight, per 100 parts by weight of ferromagnetic particles contained in the first magnetic layer, and the isocyanate content of the second magnetic layer is preferably from 5 to 10 parts by weight and more preferably from 6 to 8 parts by weight, per 100 parts by weight of ferromagnetic particles contained in the second magnetic layer, and the isocyanate content contained in the first magnetic layer is preferably larger than that in the second magnetic layer by 2 parts by weight or more.

(4) A magnetic recording medium in which the first magnetic layer contains preferably from 1.0 to 20 parts by weight (more preferably from 8 to 15 parts by weight) carbon black per 100 parts by weight of ferromagnetic particles contained in the first magnetic layer, and the second magnetic layer contains preferably from 0.1 to 10.0 parts by weight (more preferably from 1 to 6 parts by weight) carbon black per 100 parts by weight of ferromagnetic particles contained in the second magnetic layer.

(5) A magnetic recording medium in which an average particle size of alumina ($Al_2O_3$) contained in the second magnetic layer is preferably from 0.1 to 0.7 microns and more preferably from 0.1 to 0.5 microns, and the alumina content is preferably from 1 to 20 parts by weight and more preferably from 4 to 12 parts by weight, per 100 parts by weight of ferromagnetic particles contained in the second magnetic layer.

(6) A magnetic recording medium in which the ferromagnetic particles contained in the first magnetic layer have a specific surface area of preferably 30 m$^2$/g or less measured by the BET method, and the ferromagnetic particles contained in the second magnetic layer have a specific surface area of preferably 40 m$^2$/g or more measured by the BET method.

(7) A magnetic recording medium in which ferromagnetic particles contained in the second magnetic layer have a coercive force of preferably 1000 Oe or less and more preferably 800 Oe or less, ferromagnetic particles contained in the first magnetic layer have a coercive force of preferably 600 Oe or more and more preferably 630 Oe or more, and the ferromagnetic particles contained in the first and second magnetic layers are preferably cobalt-modified gamma-$Fe_2O_3$.

(8) A method for manufacturing a magnetic recording medium in which the coating composition for at least one magnetic recording layer is preferably coated and subsequently calendered out at a temperature of 30° to 150° C., under a linear pressure of 80 to 500 Kg/cm.

(9) A magnetic recording medium which comprises the plural magnetic layers comprising the first and/or second magnetic layers containing further plural magnetic layers.

In the present invention, the center line average roughness (Ra) shows the mean deviation of measured points from a center plane which corresponds to the center level of all measured points.

The density of protrusions (Ds) is calculated as follows.

Among points detected by a CCD array, points which are higher than 24 points around them are regarded as protrusions, and the number of such protrusions is divided by an unit area to provide Ds.

The center line average height (Ra) and the density of protrusions (Ds) are measured according to the following conditions.

The measuring apparatus used: Heterodyne interference three dimensional roughness measuring apparatus "TOPO-3D" manufactured by WYKO Co., Ltd.

(1) The reading condition for the measuring apparatus:

The reading condition of interference fringes:

Objective lens: 40×1 micron m$^2$ per one picture element

CCD array: 256×256

(2) The condition for the data analysis:

The measured values are subjected to a spherical surface correction, a cylinder correction, and an inclination correction.

Such corrections, for example, the spherical surface correction is carried out as follows. A certain spherical surface is determined so that the RMS (root mean square value) of the distance between the spherical surface and measured points can be minimized, and the number of the coordinates of the spherical surface is subtracted from the measured points.

The polyethylene terephthalate (PET) support used in the present invention is obtained by adding the above noted inert inorganic particles to polyethylene terephthalate, and then forming a film from it using the biaxial orientation method.

The magnetic recording medium of the present invention can be manufactured, for example, as follows.

A coating composition for the first magnetic layer is coated on a nonmagnetic support, followed by a magnetic orientation treatment and a calendering treatment, and then a coating composition for the second magnetic layer is coated thereon, followed by a magnetic orientation treatment and a calendering treatment, thus forming plural magnetic layers on the support.

Particularly preferred is a wet-on-wet coating method (as described in JP-A-62-124631) in which the second magnetic layer is formed on the first magnetic layer while the first magnetic layer is wet.

The magnetic layers according to the present invention comprise ferromagnetic particles dispersed in a binder. The ferromagnetic particles used in the present invention are not particularly limited.

Examples of the ferromagnetic particles include gamma-$Fe_2O_3$, Co-containing gamma-$Fe_2O_3$, $Fe_3O_4$, Co-containing $Fe_3O_4$, $CrO_2$, Co-Ni-P alloy and Fe-Co-Ni alloy, each of which are known.

In the present invention, it is preferred to use abrasive agents one or more of the magnetic layers. The abrasive agents are not particularly limited, and those having a Moh's hardness of generally 6 or higher and preferably 8 or higher are used. Examples thereof include MgO (Moh's hardness: 6), $Cr_2O_3$ (Moh's hardness 8.5), alpha-$Al_2O_3$ (Moh's hardness: 9), gamma-$Al_2O_3$ (Moh's hardness: 7 to 8), and SiC (alpha, or gamma, Moh's hardness: 9.5). The abrasive agents preferably have a particle size of 0.01 to 1.5 microns and more preferably 0.10 to 0.8 microns. The content of the abrasive agents is preferably 0.5 to 10 parts by weight and particularly preferably 1 to 5 parts by weight, per 100 parts by weight of ferromagnetic particles. If desired, abrasive agents which differ in kinds and particle sizes may be used together.

It is preferred that the abrasive agents are used in the second magnetic layer.

The binder solution for forming a magnetic coating composition used in the present invention comprises binders (i.e., binder resin components), solvents, and if desired, lubricating agents. The binders can be a thermoplastic resin, a thermosetting resin, a reactive type resin, or a mixture thereof which are conventionally known.

Examples of the binders include a vinyl chloride copolymer (e.g., a copolymer of vinyl chloride and vinyl acetate, a copolymer of vinyl chloride and vinyl acetate and vinyl alcohol, a copolymer of vinyl chloride and vinyl acetate and acrylic acid, a copolymer of vinyl chloride and vinylidene chloride, a copolymer of vinyl chloride and acrylonitrile, an ethylene-vinyl acetate copolymer, a vinyl chloride copolymer to which a polar group such as —$SO_3Na$ or —$SO_2Na$ and an epoxy group are introduced), a cellulose derivative (e.g., a nitro cellulose resin), an acrylic resin, a polyvinyl acetal resin, a polyvinyl butyral resin, an epoxy resin, a phenoxy resin, and a polyurethane resin (e.g., a polyester polyurethane resin, a polyurethane resin to which a polar group such as —$SO_3Na$ or —$SO_2Na$ is introduced and a polycarbonate polyurethane resin).

As a hardening agent, polyisocyanate compounds can be preferably used. In general, such polyisocyanate compounds can be selected from those usually used as a hardening agent for polyurethane resins.

When a hardening treatment is conducted by electron beam irradiation, a compound having a reactive double bond such as a urethane acrylate can be used.

Examples of solvents for forming the magnetic coating composition of the present invention include ketones such as acetone, methyl ethyl ketone, methyl isobutyl ketone, ethyl isobutyl ketone, or cyclohexanone; esters such as methyl acetate, ethyl acetate, butyl acetate, or glycol acetate monoethyl ether; glycol ethers such as diethyl ether, dimethyl ether, glycol dimethyl ether, or dioxane; aromatic hydrocarbons such as benzene, toluene, or xylene; and chlorinated hydrocarbons such as methylene chloride, ethylene chloride, carbon tetrachloride, chloroform, ethylene chlorohydrin or dichlorobenzene.

These solvents can be used alone or in combination. Particularly preferred is a polar solvent such as ketones or a solvent containing a polar solvent.

Ferromagnetic particles are uniformly mixed and dispersed together with a binder solution when a magnetic coating composition is prepared. To this end, there is generally used a method in which pre-dispersion is carried out using a two-rod roll mill, a three-rod roll mill, an open kneader, a press kneader, or a continuous kneader, etc., and then post-dispersion is carried out using a sand grinder, or a ball mill, etc.

Using conventional techniques, there may be optionally added to the magnetic coating composition any of various additives such as a lubricating agent and a dispersing agent, etc., according to the objects.

The magnetic coating composition may be coated using methods such as air doctor coating, blade coating, rod coating, air knife coating, extrusion coating, squeeze coating, impregnating coating, reverse roll coating, transfer roll coating, gravure coating, kiss coating, cast coating, spray coating, bar coating, spin coating, etc.

Hitherto, there has been described a magnetic recording medium of the present invention comprising two magnetic layers comprising upper and lower layers. However, so long as the magnetic recording medium contains two magnetic layers having the specified properties mentioned above, the magnetic layers may be formed of three layers or more.

The magnetic recording tape of the present invention comprises a support having a very smooth surface so that the surface property of the lower magnetic layer is extremely increased. Consequently, smoothness of the surface of the tape is extremely improved, with the result that there is provided a magnetic recording tape having high electromagnetic characteristics which cannot be obtained by conventional tapes.

The use of protrusions shaped as described above provides excellent running durability. This is because the amount of protrusions contained in the support is controlled so that a predetermined number or more of protrusions are always present in the contact portions of the tape. Therefore, forces which are applied to each of protrusions becomes small so that deformation of protrusions is prevented. As a result, the friction coefficient of the support surface is prevented from being raised.

When a determinated number or more of protrusions are distributed, there is a problem that electromagnetic characteristics decrease. On the contrary, if the number of protrusions is decreased to less than a determinated number, protrusions in the support are deformed while the tape is running. As a result, the friction coefficient increases and problems such as edge damage occur while the tape is running.

In this manner, there can be produced a magnetic recording medium having high electromagnetic characteristics as well as excellent running durability.

The present invention will be illustrated in more detail by the following Examples. In all Examples, all parts are by weight.

EXAMPLE

| Formulation of Magnetic coating composition for forming the second magnetic layer: | |
|---|---|
| Co-gamma-$Fe_2O_3$ (Hc: 700 Oe, Specific surface area ($S_{BET}$): 40 $m^2/g$) | 100 parts |
| Copolymer of vinyl chloride, vinyl acetate and maleic anhydride (Composition ratio: 86/13/1, Degree of polymerization: 400) | 12 parts |
| Polyester polyurethane (Average molecular weight: 20,000) | 9 parts |
| Carbon black (Average particle size: 80 millimicrons) | 10 parts |
| Alpha-$Al_2O_3$ (Average particle size: 0.5 microns) | 40 parts |
| Oleic acid | 1 parts |
| Butyl stearate | 2 parts |
| Stearic acid | 3 parts |
| Butyl acetate | 200 parts |
| Formulation of Magnetic coating composition for forming the first magnetic layer: | |
| Co-gamma-$Fe_2O_3$ (Hc: 650 Oe, Specific surface area ($S_{BET}$): 25 $m^2/g$) | 100 parts |
| Copolymer of vinyl chloride, and vinyl acetate and maleic anhydride (Composition ratio: 86/13/1, Degree of polymerizaton: 400) | 12 parts |
| Polyester polyurethane (Average molecular weight: 20,000) | 9 parts |
| Carbon black (Average particle size: 30 millimicrons) | 5 parts |
| Red oxide (alpha-$Fe_2O_3$) | 10 parts |
| Oleic acid | 1 parts |
| Butyl stearate | 2 parts |
| Stearic acid | 3 parts |
| Butyl acetate | 200 parts |

Each of the above two magnetic coating compositions was mixed and dispersed using a sand mill. 6 parts of polyisocyanate and 40 parts of butyl acetate was added to the obtained dispersion solution for forming the first magnetic layer, and then filtered off using a filter having an average aperture size of 1 micron to prepare the magnetic coating composition for the first magnetic layer. 3 parts of polyisocyanate and 40 parts of butyl acetate was added to the obtained dispersion solution for forming the second magnetic layer, and then filtered off using a filter having an average aperture size of 1 micron to prepare the magnetic coating composition for the second magnetic layer.

The magnetic coating composition for the first magnetic layer was coated, in a dry thickness of 3.5 microns, on a polyethylene terephthalate support shown in Table 1 using an extruding coater having a slot for forming the first magnetic layer while the support was run at a speed of 60 m/minute. Immediately after the coating, i.e., while the first magnetic layer is wet, the magnetic coating composition for the second magnetic layer was coated, in a dry thickness of 0.5 microns, on the first magnetic layer using an extruding coater having a slot for forming the second magnetic layer. While the magnetic layers are wet, they were subjected to magnetic orientation with magnets. After drying, it was subjected to super calendaring treatment, and slit to a ½ inch width to prepare a video tape. This process was repeated for each support shown in Table 1.

Evaluation of Sample Tapes

CS/N (color.carrier/noise ratio):

The video tapes were recorded with a video tape recorder "NV-8300" produced by Matsushita Electric Industrial Co., Ltd, and the CS/N on the recorded tapes was measured with a noise meter ("925C" produced by Shibasoku Co., Ltd.) using a high-pass filter (10 KHz) and a low-pass filter (500 KHz AM). Dropout:

The sample tapes were mounted on a VHS tape deck and were run for 100 passes. Then, the number of dropouts of $15 \times 10^{-6}$ sec per 1 minute was measured using a dropout counter "VD-3D" produced by Victor Company of Japan, Limited. Wear-Out of a Backing Layer:

Sample tapes of 5 minutes-length were repeatedly run for 250 passes (play-rewind) on the tape deck, and the scratches made on the backing layer of the sample tapes were visually observed and were evaluated based on the following three levels.

| Number of Scratches | Level |
|---|---|
| 0 | G |
| 1 to 5 | M |
| 6 or more | B |

Comprehensive Evaluation:

The comprehensive evaluation was evaluated based on the following four levels.
E: Excellent
G: Practical
M: Nearly practical
B: Impractical

TABLE 1

| | Characteristics of Support | | | | | | | | | | |
|---|---|---|---|---|---|---|---|---|---|---|---|
| | Upper Surface of Support | | Back Surface of Support | | Fillers | | | Result of Evaluation | | | |
| Sample No. | Ra (nm) | Ds (number/ $mm^2$) | Ra (nm) | Ds (number/ $mm^2$) | Kind | Average Particle Size ($\mu m$) | Standard Deviation | CS/N (dB) | Number of Dropout (/min) | Wear-out of Backing Layer | Evaluation |
| 1 | 18.4 | 8645 | 18.9 | 8380 | Calcium Carbonate. Silica | 1.80 | 0.07 | −0.6 | 5 | G | B |
| 2 | 15.8 | 6050 | 16.0 | 6100 | Calcium Carbonate. | 0.60 | 0.05 | −0.1 | 3 | G | E |

TABLE 1-continued

| | Characteristics of Support | | | | | | | Result of Evaluation | | | |
|---|---|---|---|---|---|---|---|---|---|---|---|
| | Upper Surface of Support | | Back Surface of Support | | Fillers | | | | | | |
| Sample No. | Ra (nm) | Ds (number/ mm²) | Ra (nm) | Ds (number/ mm²) | Kind | Average Particle Size (μm) | Standard Deviation | CS/N (dB) | Number of Dropout (/min) | Wear-out of Backing Layer | Evaluation |
| 3 | 14.3 | 7450 | 12.1 | 7580 | Silica Calcium Carbonate. Silica | 0.70 | 0.05 | 0 | 3 | G | G |
| 4 | 13.4 | 7830 | 14.5 | 7150 | Calcium Carbonate. Silica | 0.60 | 0.05 | 0.2 | 2 | G | E |
| 5 | 10.8 | 9260 | 11.2 | 9650 | Calcium Carbonate. Silica | 0.50 | 0.06 | 0.1 | 2 | G | G |
| 6 | 10.5 | 7800 | 11.4 | 8500 | Silica | 0.60 | 0.09 | 0.3 | 3 | G | E |
| 7 | 13.8 | 3500 | 13.6 | 3480 | Calcium Carbonate. Kaolin | 1.20 | 0.09 | −0.5 | 12 | B | B |
| 8 | 12.5 | 4870 | 12.2 | 4560 | Calcium Carbonate | 1.20 | 0.03 | −0.6 | 12 | B | B |
| 9 | 7.1 | 2860 | 4.7 | 4400 | Calcium Carbonate. Silica | 0.30 | 0.08 | 0.2 | 15 | B | B |
| 10 | 10.7 | 9000 | 11.5 | 9800 | Silica | 0.3/0.8 | 0.32 | −0.2 | 6 | G | M |

As is apparent from the results shown in Table 1, it can be seen that samples prepared in accordance with the present invention, which have specified values with respect to a center line average roughness (Ra), the density of protrusions (Ds), average particle size, and standard deviation, exhibit good results for CS/N and running durability. On the other hand, Sample No. 9, which is shown in JP-A-63-175222 and which contains 2 kinds of fillers each widely differing from each other in particle size, exhibits insufficiency regarding CS/N and comprehensive evaluation.

While the invention has been described in detail and with reference to specific embodiments thereof, it will be apparent to one skilled in the art that various changes and modifications can be made therein without departing from the spirit and scope thereof.

What is claimed is:

1. A magnetic recording medium which comprises a plurality of magnetic layers comprising at least first and second magnetic layers containing ferromagnetic particles which layers are successively formed on a surface of a polyethylene terephthalate support, wherein said support contains inert inorganic particles consisting essentially of particles having an average particle size of from 0.5 to 0.7 microns and a standard deviation of 0.1 microns or less and a Mohs' hardness of from 3 to 8, and both front and back surfaces of said support have a center-line average roughness (Ra) of 16 nm or less and a density of protrusions (Ds) of 6000/mm² or more in the case of protrusions of 0.7 microns or more.

2. A magnetic recording medium as in claim 1, wherein the center line average roughness (Ra) in the surface of said support is 12 nm or less.

3. A magnetic recording medium as in claim 1, wherein the density of protrusions (Ds) in the surface of said support is 7000/mm² or more.

4. A magnetic recording medium as in claim 1, wherein said inorganic particles are selected from the group consisting of silica, calcium carbonate, alumina and titanium oxide.

5. A magnetic recording medium as in claim 1, wherein the second magnetic layer contains alumina, the average particle size of alumina contained in the second magnetic layer is 0.1 to 0.7 microns, and the alumina content is 1 to 20 parts by weight per 100 parts by weight of ferromagnetic particles contained in the second magnetic layer.

6. A magnetic recording medium as in claim 1, wherein the ferromagnetic particles contained in the first magnetic layer have a specific surface area of 30 m²/g or less as measured by the BET method, and the ferromagnetic particles contained in the second magnetic layer have a specific surface area of 40 m²/g or more as measured by the BET method.

7. A magnetic recording medium as in claim 1, wherein ferromagnetic particles contained in the second magnetic layer have a coercive force of 1000 Oe or less, the ferromagnetic particles contained in the first magnetic layer have a coercive force of 600 Oe or more, and the ferromagnetic particles contained in the first and second magnetic layers are cobalt-modified gamma-$Fe_2O_3$.

8. A magnetic recording medium as in claim 1, wherein said first magnetic layer contains isocyanate in an amount of from 8 to 12 parts by weight per 100 parts by weight of the ferromagnetic particles contained in the first magnetic layer and said second magnetic layer contains isocyanate in an amount of from 5 to 10 parts by weight per 100 parts by weight of the ferromagnetic particles contained in the second magnetic layer.

* * * * *